Feb. 10, 1953     R. L. TEMPLIN     2,627,661
EXTENSOMETER CALIBRATING INSTRUMENT
Filed Aug. 16, 1949     2 SHEETS—SHEET 2
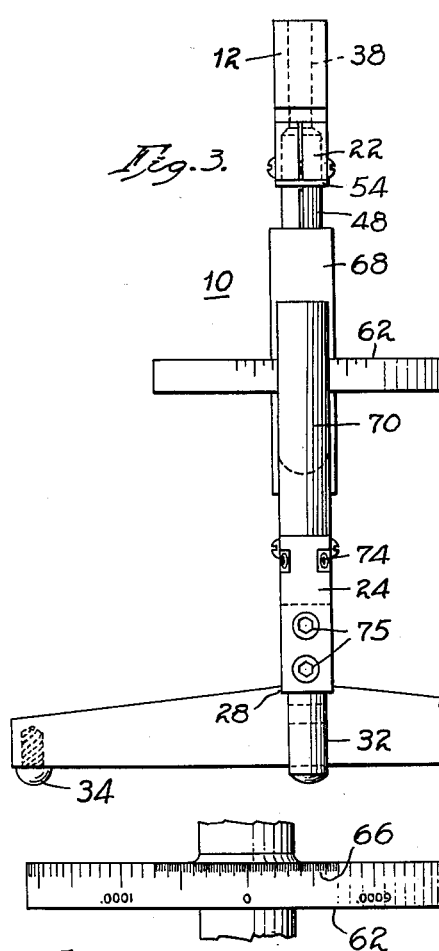
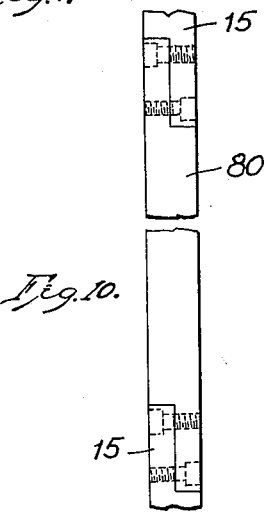
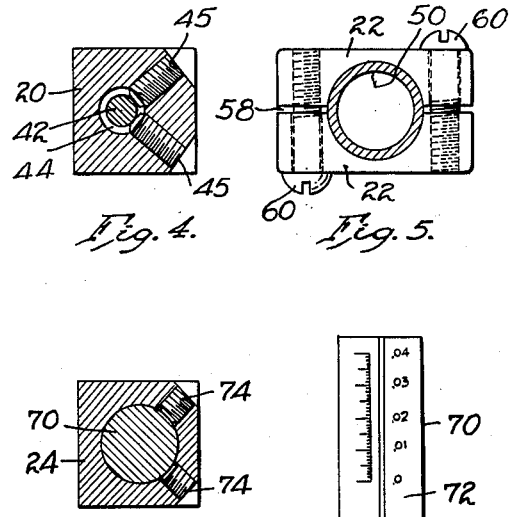
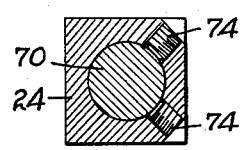
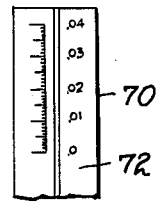
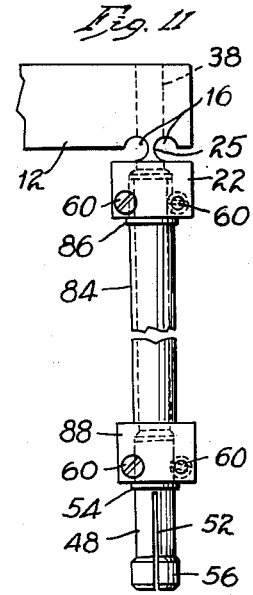
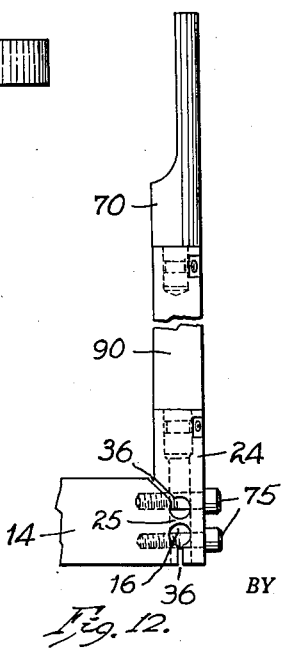
INVENTOR.
Richard L. Templin.
BY S. Ernest Low
ATTORNEY.

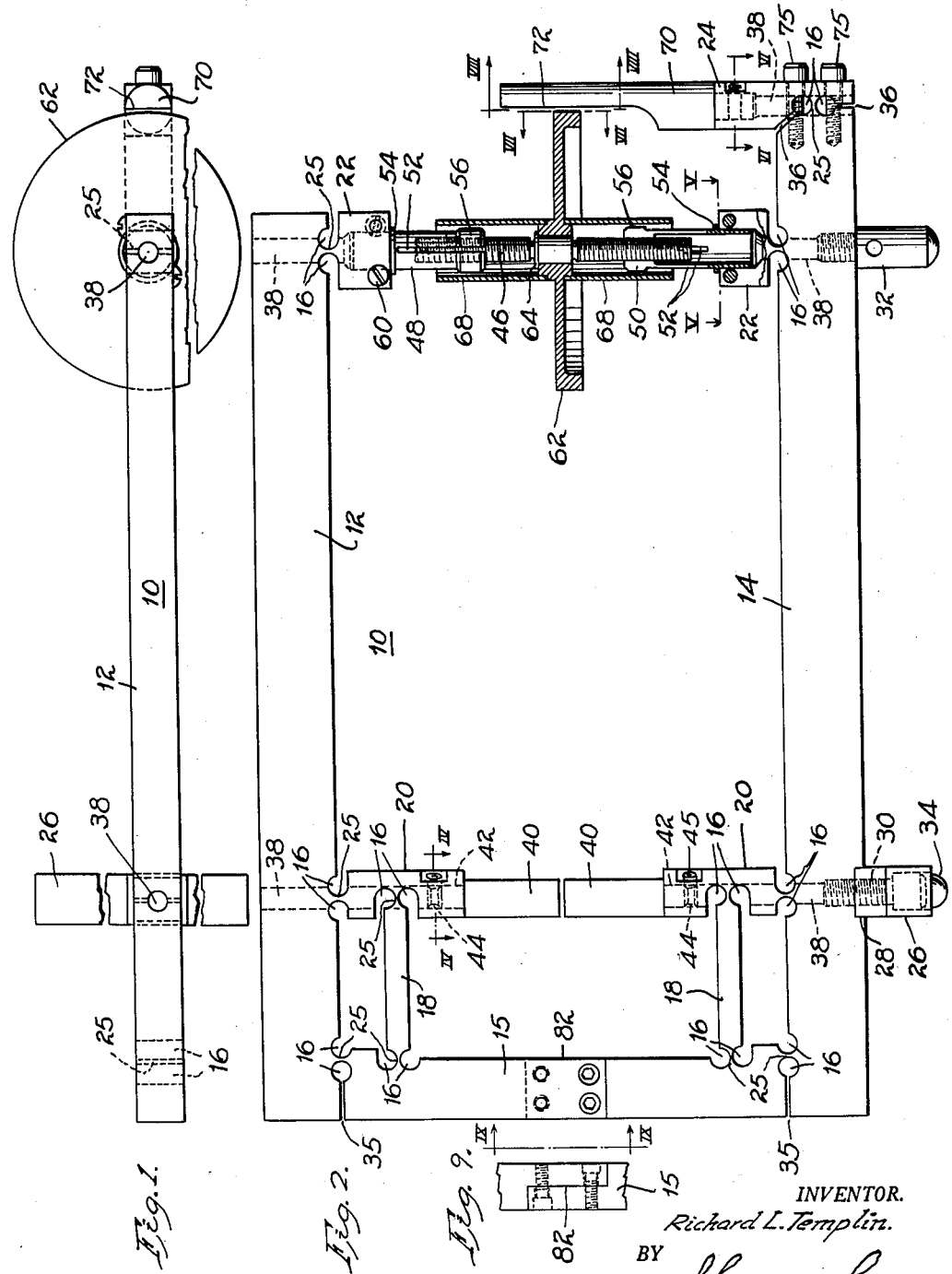

Patented Feb. 10, 1953

2,627,661

UNITED STATES PATENT OFFICE 2,627,661

EXTENSOMETER CALIBRATING INSTRUMENT

Richard L. Templin, New Kensington, Pa., assignor to Aluminum Company of America, Pittsburgh, Pa., a corporation of Pennsylvania Application August 16, 1949, Serial No. 110,633

5 Claims. (Cl. 33—148)

The invention hereinafter described relates generally to materials testing equipment. It is more specifically concerned with scientific apparatus for calibrating extensometers, strainometers, etc., or similar original deformation measuring instruments and devices.

There are relatively few presently available instruments for calibrating the numerous existing strain or deformation measuring devices in daily use, and those calibrators or comparators that do exist represent a considerable investment, as measured in terms of their initial cost, size, weight, maintenance and infrequent use. Existing calibrators also exhibit varying degrees of accuracy and sensitivity.

The wide and numerous variety of deformation measuring devices or instruments (extensometers, strainometers, etc.) available today, with few exceptions, depend upon a mechanical system of levers, gears, or both, as the basic mechanism for measuring and magnifying minute measurements. Electrical and/or optical systems are also sometimes employed to further increase the magnifying sensitivity, and presumably the accuracy of such deformation measuring apparatus.

Experience gained over a long period of use of a wide variety of makes and types of dial gages, extensometers and strain gages has definitely established that such apparatus should be calibrated as originally delivered by its manufacturer, as well as at comparatively frequent intervals during its regular routine use, to insure the accuracy of the data obtained therefrom. Regardless of the regularity selected for calibrating strain measuring instruments, it is imperative that a check calibration be conducted following any adjustment or repairs of such instruments, and particularly where the adjustments or repairs involve the multiplying systems of the devices.

It is an object of the present invention to provide a relatively inexpensive, light-weight and compact calibrating instrument having a minimum number of parts and elements in its construction.

Another object is to provide a calibrating device that is portable and readily movable into position to calibrate instruments incorporated in relatively large, stationary deformation measuring apparatus.

It is a further object of the invention to provide a comparator which exhibits a high degree of sensitivity and accuracy over its entire range of measurement, as well as being capable of accommodating the range of gage lengths normally encountered in physical testing instruments.

Another object is to provide a calibrating device which can be manufactured through the use of regularly employed and recognized machine tools with a minimum number of jigs and fixtures, and a minimum amount of experience on the part of the machine tool operators.

A further object is the provision of a calibrating instrument that is readily portable and rugged in its construction, which incorporates a minimum of features susceptible to maladjustment and wear, and which is sensitive in its operation and use in measuring changes in deformation in the order of the nearest 0.000002 inch, and by estimation to 0.000001 inch.

These and other objects will become apparent on consideration of the following description and drawings, in which:

Fig. 1 represents a top plan assembly view of a calibrating device embodying the principles and features of the invention;

Fig. 2 represents a side elevational view of the instrument of Fig. 1, with portions shown in section;

Fig. 3 represents an end elevational view looking towards the left in Fig. 2;

Fig. 4 represents a section, to enlarged scale, taken on the plane IV—IV in Fig. 2;

Fig. 5 represents a section, to enlarged scale, taken on the plane V—V in Fig. 2;

Fig. 6 represents a section, to enlarged scale, taken on the plane VI—VI in Fig. 2;

Fig. 7 represents a fragmentary elevational view, to enlarged scale, taken in the direction of the arrows VII—VII in Fig. 2;

Fig. 8 represents a fragmentary elevational view, to enlarged scale, taken in the direction of the arrows VIII—VIII in Fig. 2;

Fig. 9 represents a fragmentary elevational view taken in the direction of the arrows IX—IX in Fig. 2;

Fig. 10 represents a fragmentary elevational view of a modified portion of the device of the invention;

Fig. 11 represents a fragmentary elevational view of a modified portion of the device; and Fig. 12 represents a fragmentary elevational view of a modified portion of the device.

In general terms, the instrument or device of the invention comprises a mechanical lever system in association with a calibrated differential micrometer screw capable of direct reading to the nearest 0.000002 inch, and estimated reading of 0.000001 inch. The mechanical lever system is constructed in the form of a substantially C-shaped frame having sensitive fulcral plate media incorporated at desired locations in the frame structure to permit movement or displacement of the various levers constituting the frame under known conditions imposed thereon by the differential micrometer screw. The micrometer screw is adjustably mounted in the frame with similar sensitive fulcral plate connections incorporated in its attachment thereto, as is a suitable station for receiving and supporting the instrument to be calibrated by the calibrating device of the invention.

Since extensometers, and similar apparatus for measuring deformations and strains, are usually designed and provided for routine use over gage lengths of from about $\frac{1}{16}$ to 10 inches, extension bars of elements have been provided for the calibrating device, which are insertable in the C-shaped frame of the lever system to adapt the instrument to the various gage lengths encountered in use.

Main frame

Referring to the drawings, the instrument selected for purposes of illustration, and incorporating the basic principles of the invention, comprises a substantially C-shaped, mechanical lever frame structure represented in its entirety by the reference numeral 10. Frame 10 is preferably made from a suitable, solid, metallic plate, and when temperature variations are anticipated in the use of the device, best results will be obtained by selecting a metal or alloy having a low coefficient of expansion, such as the iron-nickel alloy known as Invar.

The main frame 10 includes in its construction upper and lower, normally parallel rail members 12 and 14 and an end leg or tie member 15. To minimize the number of machining operations and tools required to produce and impart the desired characteristics to the instrument, frame 10 is preferably made by selecting a rectangular plate of desired material of sufficient area to encompass the members 12, 14 and 15, and of sufficient thickness to provide the desired cross section for these members.

Having selected such a rectangular plate, it is thereafter laid out to accurately locate the centers of a plurality of apertures or holes 16. The holes 16 are preferably drilled and reamed through the plate, a simple inexpensive jig serving this purpose. Following the drilling and reaming operations, which should provide a total of twenty-two apertures or holes 16 through the rectangular plate, the inside contours of the frame 10 are produced, as by employing a band saw, with or without the use of a supplemented jig or templet.

The inside contours of the frame 10 comprise the interior edges of the aforementioned members 12, 14 and 15, normally horizontal, inwardly projecting web members 18, associated downwardly and upwardly, co-axially aligned boss members 20, similar downwardly and upwardly, co-axially aligned boss members 22, and a terminal upwardly extending leg or boss 24. It is significant to observe that each pair of drilled and reamed holes 16, all of which are preferably of the same diameter, provides a relatively thin web section 25 therebetween that constitutes the aforementioned plate fulcral media for integral connection of the webs 18 to the end member 15, bosses 20 and 22 to longitudinal members 12 and 14, leg member 24 to longitudinal member 14, and end leg or tie member 15 to longitudinal members 12 and 14.

The left hand end of the frame 10 is equipped with a cross member 26, notched at 28 to receive the lower longitudinal rail member 14, and is secured thereto by means of a suitable machine screw fastening element 30. The right hand end of frame 10 is provided with an adjustable foot, in the form of a shouldered, convex headed pin 32, threadedly engaged within member 14 from its under side. Foot 32, and equivalent adjustable, convex headed screw members 34, threadedly attached to the under side of cross member 26, provide inherently stable and adjustable three-point support for the frame 10.

Additional flexibility is imparted to the frame 10 at the various plate fulcral locations defined between the drilled and reamed holes 16 by providing the horizontal saw cuts 35 in the tie member 15, and the vertical and diagonal saw cuts 36 adjacent the fulcral plate connection between boss 24 and lower horizontal rail member 14. Also, vertical drilled and reamed holes or apertures 38 are preferably provided through the upper and lower rail members 12 and 14, as well as through the bosses 20, 22 and 24, adjacent the fulcral connections between these rail members and bosses, to improve the flexibility of the boss connections and provide sockets therein for a purpose to be hereinafter described.

Instrument station

Rods 40, preferably cylindrical in shape and of a material of specific interest to the users of an instrument to be calibrated, are reduced at one end to provide a cylindrical extension 42 having an annular groove 44 machined or otherwise formed therein. The diameter of the reduced sections 42 is a close sliding fit within the aligned, drilled and reamed holes 38 in the bosses 20, which receive the rods, set screws 45 threaded through the bosses and projecting into the annular grooves 44 serving to provide rigid but removable connections and mounting for the rods 40. The rods 40 are spaced a slight distance adjacent their ends and constitute a station for mounting the extensometer, strainometer, or equivalent deformation measuring instrument, to be checked or calibrated for sensitivity and accuracy.

Micrometer screw and micrometer station

The micrometer screw is supported in the bosses 22 at the opposite end of the C-shaped frame 10 from that at which the instrument station is located, and its location is herein termed the micrometer station.

The micrometer itself is constructed in the form of a shank or bolt member 46 provided at its opposite ends with unidirectional threads of different pitch. The threaded ends of the shank 46 are received within complementary elongated nut members 48 and 50 each clamped adjacent one of its ends in one of the bosses 22.

Nuts 48 and 50 are generally cylindrical in form and are preferably provided with slots 52 over that portion of their length extending beyond an integral shoulder or flange 54 on each nut which engages its respective boss 22 to limit the projection of each nut beyond its boss and towards each other. Adjacent the ends of the slots 52 each of the nuts 48 and 50 is provided with a thickened circumferential band 56, the purpose of which is to provide the internal thread bearing portion of each nut. The thickened bands 56 prevent distortion of the thread engaging portions of nuts 48 and 50, and the slots 52 provide spring-like fingers, which serve as striking or peening surfaces for regulating and/or adjusting the degree of spring tension exerted between the thread engaging portions of nuts 48 and 50 on the threaded micrometer bolt 46.

It will be appreciated that the differentially threaded bolt 46 and complementary nuts 48 and 50 are accurately aligned in respect to the bosses 22 in an unstrained condition of the main frame 10. Rigid clamping of the nuts 48 and 50 within the bosses 22 is accomplished by providing vertical slots 58 (Fig. 5) in the bosses 22 over their depth, but avoiding any severance or weakening of the webs 25 attaching the bosses to the frame members 12 and 14. Clamping screws 60 insure rigid clamping of the bosses 22 on the extreme opposite ends of the spring tension nuts 48 and 50.

Intermediate the ends of the micrometer bolt 46, a disk 62 is rigidly secured, as by a press fit thereon into engagement with a flange 64 formed integral with the bolt. The disk 62 is suitably graduated on its vertically disposed peripheral face, as shown to best advantage at 66 in Fig. 7. Tubular shielding element 68 may be mounted on the disk 62, as by press fitting the same on the hub thereof, to extend axially along the threaded ends of the bolt member 46 in spaced relationship to the bolt and its complementary nuts 48 and 50. The tubular shielding 68 serves to protect the exposed bolt threads against injury and ingress of excess foreign material, dirt and the like.

A suitable index scale or bar 70, which may actually be considered a portion of the main frame 10, is cooperatively associated with the micrometer disk 62. Scale 70 is preferably constructed in the form of a cylindrical bar with a flat graduation-bearing surface 72 (Fig. 8) provided thereon. The lower cylindrical end of bar 70 is preferably turned down to provide a sliding fit within a cylindrical aperture in the boss 24. Set screws 74 serve to secure the bar 70 in rigid attachment to the frame 10. Also, adjusting screws 75, located on either side of the plate fulcral web 25, provide means for adjustably aligning the graduated index scale 72 in proper relationship with the peripheral scale 66 on the micrometer disk 62. It will be observed that slots 36, through which the adjusting screws 75 extend, aid in this respect.

*Operation*

In the operation of the calibrating device thus far described, it is necessary to specify certain numerical values and proportions for the apparatus to obtain a thorough understanding of its usefulness and accuracy in operation. Referring specifically to the apparatus, as illustrated in Figs. 1 through 9, the total range of measurement of the apparatus, as illustrated, is 0.04 inch. Primarily the instrument functions as a result of changes in dimensions at the instrument station effected by movement or displacement of the lever system of the C-frame 10 through the medium of the differential micrometer screw 46 and its associated nuts 48 and 50.

As a specific choice, for purposes of illustration, nut 48 and its engaging portion of micrometer bolt 46 may be provided with 40 threads per inch, and nut 50 and its engaging portion of the micrometer bolt may be provided with 50 threads per inch. With this selected unidirectional differential thread arrangement, the disk 62 should be approximately 3½ inches in diameter and its peripheral face 66 graduated to indicate proportional parts of a revolution in definite relationship to the difference in the pitch of the threads on the bolt 46. In the case selected, namely, 40–50 unidirectional thread relationship, disk 62 should be provided with 500 equally spaced graduations, as illustrated at 66, Fig. 7. With this differential screw relationship and a reduction lever ratio between the micrometer station and instrument supporting station of 1 to 5, one division 66 on the disk 62 represents a change in measurement (distance between flanges 54 on nuts 48 and 50) of 0.000002 inch. By estimation, ½ division on scale 66 represents 0.000001 inch change in measurement.

In use, the micrometer disk 62 is rotated in a manner to lower its top flat surface below the zero graduation on scale 72 (Fig. 8). The disk 62 is thereafter rotated in the opposite direction to bring the top flat surface of disk 62 and its zero graduation into coincidence with the zero reading and center line on the scale 72. In this position, the frame 10 is devoid of strain except for such initial strains of negligible value that may be required to insure co-axial alignment of the bars 40 at the instrument station, and similar coaxial alignment and parallelism between the axes of bars 40 and the axis of the differential micrometer screw 46. An extensometer or similar deformation measuring instrument, to be checked or calibrated, is mounted in its normal fashion on the bars 40. The particular gage length of the instrument undergoing test calibration should preferably be equally divided on the bars 40.

With the calibrator of the invention prepared as above described, increment movements or displacements of the mechanical lever system of C-frame 10 are provided through selected rotation of the disk 62. Angular displacements of the disk 62, as determined by observing its scale 66 in terms of its relative position in respect to the vertical index scale 72, are compared for equivalency and/or accuracy with the readings produced on the scale or scales of the instrument being tested. It will be appreciated that the instrument of this invention is capable of imparting and comparing definite displacements or movements, up and down the scale, as measured on the differential micrometer scales. Variations in these readings, and simultaneously made readings on the instrument undergoing calibration, establish the degree of accuracy of the instrument under test.

*Generalization*

The instrument thus far described, in reference to Figs. 1 through 9, is approximately to scale for testing deformation measuring strainometers, and the like, up to and including two inch gage length instruments. For greater gage length instruments, extension elements are disclosed in Figs. 10, 11, and 12, which can be inserted in the original device. For example, in Fig. 10 an extension bar 80 is provided which is insertable in the leg member 15 of the device of Fig. 2, the member 15 having been originally jointed at 82 for this purpose.

The C-frame 10 having been enlarged to increase the gage length at the instrument station by the insertion of bar 80, it is now necessary to make an equivalent adjustment at the micrometer station. This is accomplished in the manner illustrated in Figs. 11 and 12. In Fig. 11 one of two insert bars 84, which may be tubular, is illustrated with a flange 86 adjacent one of its ends to duplicate the boss-engaging and clamped end of nuts 48 and 50 (Fig. 2). The opposite end of each insert bar 84 is equipped with a vertically split boss 88 identical in form to the construction of bosses 22. It is merely necessary to now insert one extension bar 84 in each boss 22 and secure the nuts 48 and 50 in position within the bosses 88 to increase or enlarge the calibrator at the micrometer station and bring it into conformity with its increase in height at the instrument station.

A further modification is required, as illustrated in Fig. 12. Therein an extension bar 90 is illustrated inserted between the boss 24 and index bar 70, which completes the modification of the calibrator of the invention for use over longer gage lengths.

The invention has been described in terms of a device that is preferably constructed from Invar, or similar material, where temperature variations may be anticipated. In this connection other materials, preferably metals or metallic alloys, may be employed for the main frame 10 and the micrometer screw 46. The micrometer nuts 48 and 50 are preferably made from brass to reduce friction at the differential threads, and the index bar or post 70 is preferably made from a transparent material, such as "Lucite," or the like, to permit visual reading through the same from the right of the instrument, as viewed in Fig. 2. In this connection, the flat graduation-bearing surface on index bar 70 may be machined in a plane behind, or to the right of, the vertical central axis of this bar, as viewed in Figs. 2 and 12. This relative position of the flat graduated surface will serve to magnify the readings made through the transparent plastic or "Lucite" index bar 70. The micrometer disk 62 may be of any suitable material, such as aluminum, or aluminum alloy, that will not corrode or add too much to the over-all weight of the instrument. An instrument constructed from Invar in accordance with the description relating to Figs. 1 through 9 weighed between 10 and 11 pounds, which accentuates the portability of the calibrating devices contemplated herein.

The mechanism has been defined in terms of being machined from a single plate of metal, so far as the C-frame 10 is concerned, in its preferred construction. Machining from a single plate permits construction of the calibrator within precise limits and insures such accuracy in the fulcral plates that the functioning of the device is relatively free of any appreciable lost motion, back lash, or hysteresis.

Machine tool and metal sawing operations have been referred to as the preferred manner for manufacturing the C-shaped frame 10 of calibrating instruments falling within the concept of the invention. To assist in the various machining operations and insure production of a substantially strain free lever system in frame 10, the order or sequence of certain of the machining operations is significant. For example, the apertures or holes 16 should be first drilled and reamed, and subsequently material should be removed to impart the desired interior contour to the frame 10. In removing the interior material, which responds at least in part to metal sawing or equivalent operations, the saw cuts 35 and 36, as well as the entrances to apertures 16, formed between the surfaces of bosses 20 and 22 and their adjacent rail members 12 and 14, should be the final machining operations. By following this sequence, it will be appreciated that the bosses 20, 22 and 24, as well as the corner connections between the rails 12 and 14 with end member 15, are rigidly supported during all other machining operations essential to their final structural features.

The instrument station, incorporating the frame-connected bosses 20 and integrally associated webs 18, is so designed that the bosses 20 flex or move mutually co-axially during increment movements or displacements of the lever system incorporated in the C-frame 10. The micrometer screw mounting on the frame 10, as well as the entire C-frame lever structure and index scale 70, has been so designed and arranged that the errors (cosine errors) commonly obtaining in apparatus, which functions on the basis of relative angular displacements of its elements and components, are eliminated, or at least minimized to negligible degree.

Although machining of the device, using standard machine tools and equipment, is the preferred mode of constructing the apparatus of the invention to insure a precision built instrument, it is not to be overlooked that precision die casting methods and equipment may be employed to produce the C-frame 10, with or without additional machining operations performed thereon. Regardless of the method of manufacture, it is a significant and important feature of the calibrating device that the fulcral plates be integral parts of the members which they support and connect in a unitary structure, as distinguished from separately constructed fulcral elements that might be attached or replaceably secured to their cooperating structural elements or foundations. The sensitivity and accuracy of the calibrating devices of the invention are direct results of the unitary and integral structure incorporated therein, which construction also eliminates the maintenance required in mechanical lever systems incorporating loose parts, knife edge fulcra, or separately attached connecting linkages. As an example of the flexibility of the calibrator described herein, adjustment of the various elements entering into its construction has been made by light hammer blows delivered adjacent one or more of the fulcral plate connections.

What is claimed is:

1. A calibrating device comprising a substantially C-shaped frame structure, integral plate fulcral connections between upright and horizontal members of the frame structure constituting flexible corner connections therebetween, an instrument receiving station between said horizontal frame members located inwardly from the flexible corner connections, a micrometer station supported between the horizontal frame members located adjacent the open end of the C-shaped frame structure, said instrument receiving station and micrometer station each incorporating integral plate fulcral connections to the horizontal frame members, and said C-shaped frame structure, instrument and micrometer stations constituting a flexible mechanical multiplying lever system.

2. A calibrating device comprising a substantially C-shaped frame structure having integral flexible plate fulcral connections between the opposite ends of an upright and upper and lower horizontal members of the frame structure, an instrument station flexibly mounted between the upper and lower horizontal members of the frame structure adjacent the upright frame member, and a micrometer station flexibly mounted between the upper and lower horizontal members of the frame structure adjacent the open end of the substantially C-shaped frame structure, said flexible, integral plate fulcral connections and flexibly mounted instrument and micrometer stations constituting a mechanical multiplying lever system.

3. A calibrating device comprising a multiplying lever system in the form of a rectangular open-ended frame having oppositely disposed normally parallel legs connected adjacent the closed end of the frame by a connecting frame member, the connections between the connecting member and the oppositely disposed normally parallel legs each comprising plate fulcra, an instrument supporting station comprising plate fulcral connected members oppositely disposed in axial alignment from the oppositely disposed normally parallel legs adjacent the closed end of the frame, and a micrometer displacement device supporting station comprising plate fulcral connected members oppositely disposed in axial alignment from the oppositely disposed normally parallel legs adjacent the open end of the frame.

4. A calibrating device comprising a multiplying lever system in the form of a normally unstrained rectangular open-ended frame having oppositely disposed normally parallel legs connected adjacent the closed end of the frame by a connecting member, the connections between the connecting member and the oppositely disposed normally parallel legs each comprising plate fulcra, an instrument supporting station adjacent the closed end of the frame, said station comprising members axially aligned in respect to each other and projecting towards each other from the oppositely disposed legs of the frame, said members having plate fulcral connection to the oppositely disposed legs and closed end connecting member, and a micrometer displacement device station adjacent the open end of the frame, said micrometer displacement device station comprising projecting members on the oppositely disposed legs of the frame and extending towards each other in axial alignment, said projecting members having plate fulcral connection to their adjacent frame legs.

5. A calibrating device for checking the accuracy and sensitivity of deformation measuring instruments, said device comprising a mechanical multiplying lever system in the form of a substantially C-shaped frame incorporating plate fulcral connections between the end and side members of said C-shaped frame, an instrument station supported between oppositely disposed side members of the C-shaped frame, said instrument station being located adjacent the closed end of the C-shaped frame and comprising mutually and co-axially aligned instrument supporting elements, said supporting elements being connected to said side members through fulcral plates integrally formed with the said side members, and a micrometer displacement device located adjacent the open end of the C-shaped frame and disposed between and adapted to impart increment movement to the oppositely disposed side members supporting the instrument station, said micrometer displacement device being attached to the oppositely disposed side members through integral plate fulcral connections.

RICHARD L. TEMPLIN.

REFERENCES CITED

The following references are of record in the file of this patent:

UNITED STATES PATENTS

| Number | Name | Date |
| --- | --- | --- |
| 987,942 | Bariquard | Mar. 28, 1911 |
| 1,908,930 | Templin | May 16, 1933 |
| 2,085,687 | Peters | June 29, 1937 |
| 2,197,116 | Tornebohm | Apr. 16, 1940 |
| 2,292,326 | Lewis | Aug. 4, 1942 |